March 7, 1950 W. R. PRICE 2,499,681
GASKET MAKING MACHINE
Filed Feb. 5, 1947 5 Sheets-Sheet 1

INVENTOR
Wm. R. Price
BY
ATTORNEY

March 7, 1950  W. R. PRICE  2,499,681
GASKET MAKING MACHINE
Filed Feb. 5, 1947  5 Sheets-Sheet 2

INVENTOR
Wm. R. Price
BY
ATTORNEY

INVENTOR
Wm. R. Price
BY
ATTORNEY

March 7, 1950  W. R. PRICE  2,499,681
GASKET MAKING MACHINE
Filed Feb. 5, 1947  5 Sheets-Sheet 4

INVENTOR
Wm. R. Price
BY
ATTORNEY

March 7, 1950 W. R. PRICE 2,499,681
GASKET MAKING MACHINE
Filed Feb. 5, 1947 5 Sheets-Sheet 5

INVENTOR
Wm. R. Price
BY
ATTORNEY

Patented Mar. 7, 1950

2,499,681

UNITED STATES PATENT OFFICE 2,499,681

GASKET MAKING MACHINE

William R. Price, Wayne, Pa., assignor to Flexitallic Gasket Company, Camden, N. J., a corporation of New Jersey Application February 5, 1947, Serial No. 726,581

11 Claims. (Cl. 29—66)

This invention relates to a machine for use in making spiral wound gaskets of the type shown in the Bohmer Patent No. 1,829,709 dated October 27, 1931, which comprises a metal strip spiral wound with a filler interposed between at least some of the metal convolutions.

In the manufacture of such gaskets the end of the metal strip is inserted in a mandrel which is then rotated to wind the first turn whereupon the mandrel is stopped and the turn is secured by welding. Thereafter the winding is continued with or without an intervening strip of compressible filler material, stopping at intervals as required to weld adjacent turns together. At the completion of the winding the outer end of the metal strip is welded to the adjacent turn to secure the formed gasket.

In the commercial winding of gaskets of the above type, it is impractical to position the first weld at the extreme end of the metal strip, particularly as it is necessary to bend over a portion of the end of the strip for insertion in the mandrel slit. A loose portion of this strip or tail accordingly projects beyodn the first weld and must be removed from the completed gasket.

An object of the present invention is to provide a machine for removing this projecting end of the gasket strip.

Another object is to provide a machine of the above type for breaking the loose end of the gasket strip at a point adjacent the first weld.

Another object is to provide a machine of the above type for treating a plurality of gaskets simultaneously.

Another object is to provide a machine of the above type having novel and improved details of construction and features of operation.

In accordance with the present invention the machine includes a receptacle which is shaped to receive and hold the gasket to be treated and may hold a plurality of such gaskets in superimposed relationship. An oscillating gripper is provided which receives the loose end of each gasket strip. The machine is so constructed that after the gasket is positioned in the receptacle the receptacle advances with respect to the gripper so as to feed the gripper along the loose end of the metal strip until the gripper engages the first weld. The receptacle is then clamped in this position and the gripper is oscillated rapidly about the point of the first weld as a center to break off the loose end and leave a smooth inner gasket surface at the weld. The gasket or gaskets are then removed manually from the receptacle.

In one embodiment the machine includes pneumatically operated mechanism for advancing the receptacle and a pneumatically operated brake for clamping the receptacle in position. The machine also includes a driving motor for oscillating the gripper and timed means for connecting the driving motor to cause the gripper to oscillate after the receptacle has been clamped in position.

Although the novel features which are characteristic of this invention are pointed out more particularly in the claims, the nature of the invention will be better understood by referring to the following description taken in connection with the accompanying drawings in which a specific embodiment thereof has been set forth for purposes of illustration.

Figure 4:
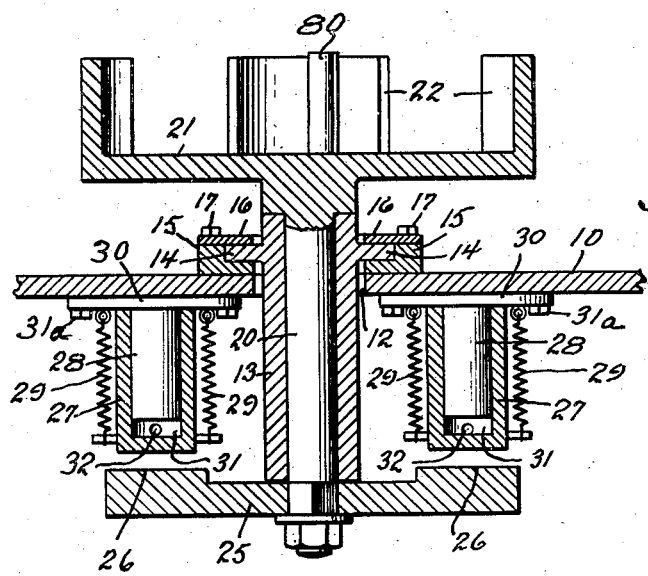
Fig. 4 is a partial vertical section taken on the line 4—4 of Fig. 2 showing the receptacle mounting and brake.

Referring to the drawings more in detail, the machine is shown as comprising a table 10 mounted on legs 11. The table 10 is provided with a slot 12 (Fig. 4) through which a bushing 13 extends. The bushing 13 is provided with side flanges 14 which are adapted to slide in channels formed by guide rails 15 and top plates 16 which are secured to the table 10 by screws 17. The slot 12 and the guide rails 15 are designed to permit limited longitudinal movements of the flanges 14 and bushing 13.

The bushing 13 carries a shaft 20 to which is attached a gasket receptacle comprising a plate 21 and vertical positioning flanges 22. The plate 21 and flanges 22 are of a shape to conform to the gasket which is to be treated. In the embodiment shown in Figs. 7, 8 and 9, the plate 21 and flanges 22 are designed to receive a four-sided gasket 24. It is to be understood, however, that these parts may be made in any desired shape in accordance with the particular gasket to be received thereon.

A brake-arm 25 is rigidly attached to the shaft 20 to turn therewith. This arm 25 is provided with a pair of friction surfaces 26 which are adapted to be engaged by plunger sleeves 27 which are slidably mounted on pins 28 and are normally held in their upper position by springs 29. The pins 28 are attached by means of plates 30 and bolts 31a to the table 10. The inner bores of the sleeves 27 extend beyond the ends of the pins 28 to form cylinders 31 having air ports 32 through which air pressure may be supplied to the cylinders for forcing the sleeves 27 downwardly into engagement with the friction surfaces 26 of the brake arm 25. The surfaces 26 are of sufficient area to register with the sleeves 27 in the various positions in which it may be desired to clamp the plate 21.

For shifting the plate 21 laterally, a cable 35 (Figs. 1, 2 and 5) is attached to an eye 36 secured to the boss 13. The cable 35 extends over an idler pulley 37 and is attached by a clip 38 to a lever 39 which is secured to a rod 40 journaled in bearings 41 secured to the legs 11. The lever 39 is provided with a groove 42 into which a set screw 43 on the clip 38 extends. The groove 42 permits the clip 38 to be adjusted along the lever 39 as required. The cable 35 is broken by a spring 44 which permits the downward movement of the lever 39 to be continued after the bushing 13 has reached the limit of its travel.

Figure 1:
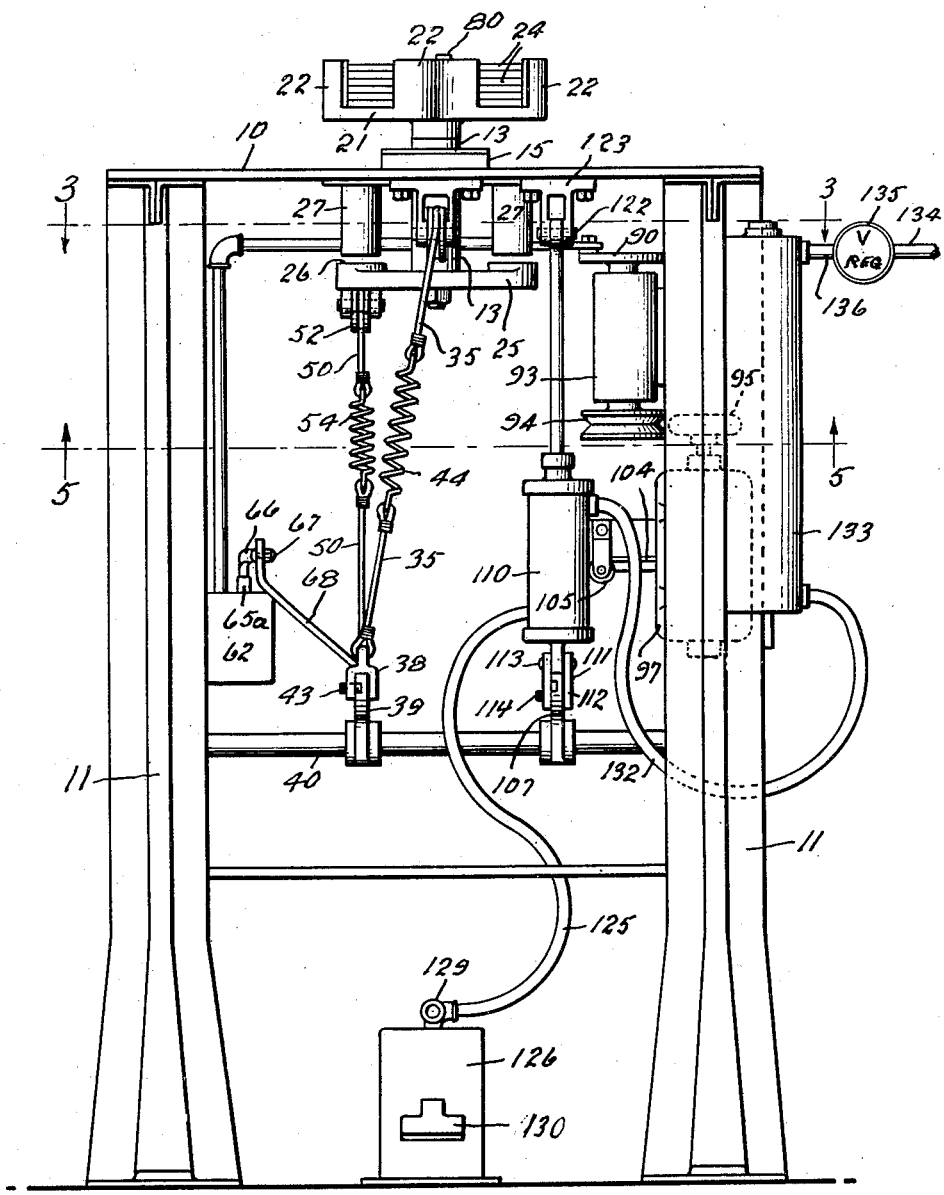
Fig. 1 is a front elevation of the gasket making machine embodying the present invention.
Figure 2:
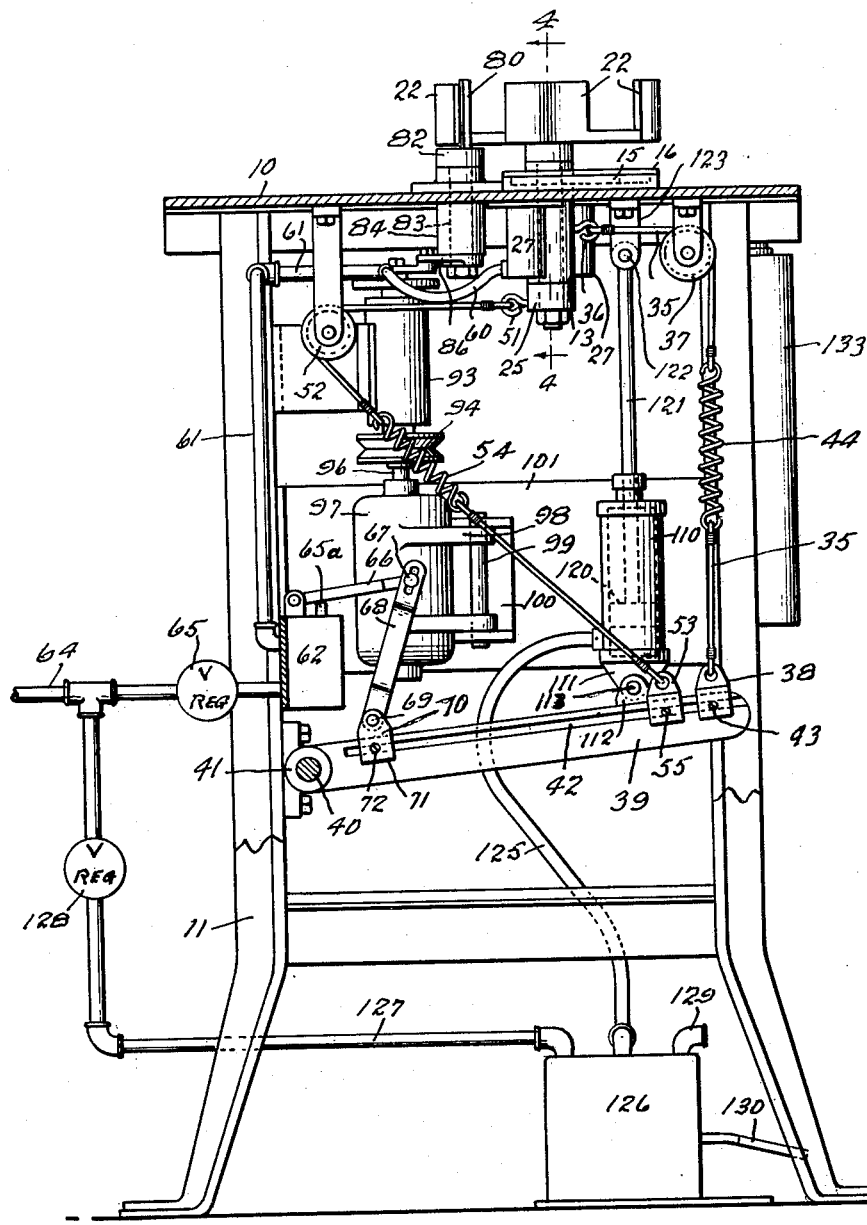
Fig. 2 is a side elevation thereof.
Figure 3:
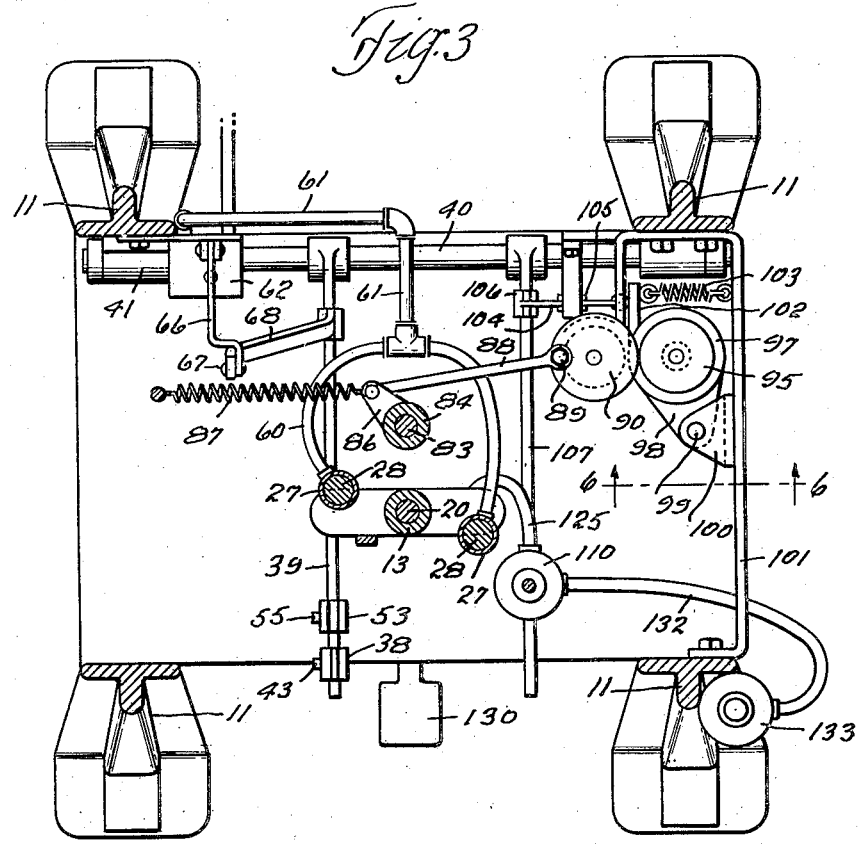
Fig. 3 is a horizontal section taken on the line 3—3 of Fig. 1.
Figure 5:
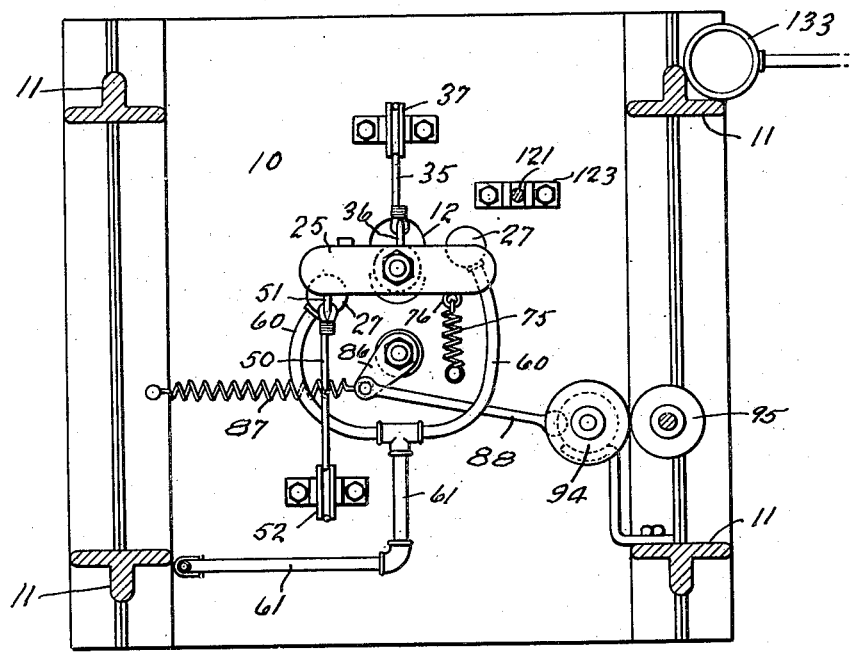
Fig. 5 is a horizontal section taken on the line 5—5 of Fig. 1.

The brake arm 25 is rotated by means of a cable 50 which is attached to an eye 51 secured to the brake arm 25 (Figs. 1, 2 and 5). The cable 50 passes over an idler pulley 52 and is attached by means of a clip 53 to the lever 39. The cable 50 is provided with sufficient slack to prevent the same from pulling on the brake arm 25 until the bushing 13 has reached the limit of its lateral movement due to the pull of the cable 35. The cable 50 is broken by a spring 54 to permit the lever 39 to continue its downward movement after the arm 25 has been actuated. The clip 53 is provided with a set screw 55 which engages the groove 42 to permit the clip 53 to be adjusted along the lever 39 as required.

The ports 32 in the cylinder 31 are connected by pipes 60 and 61 (Figs. 1, 2, 3 and 5) to an air vent valve 62 which is supplied from a compressed air line 64 through a pressure regulating valve 65. The valve 62 is controlled by a plunger 65a which is actuated by a pivoted link 66. The link 66 is adjustably pivoted by means of a pin 67 to a link 68 which is pivoted by a pin 69 to a clip 70 which is attached to the lever 39. A set screw 72 engages the groove 42 to permit the clip 70 to be adjusted along the lever 39 as required. The connection is such that when the lever 39 is depressed, the pivoted arm 66 actuates the plunger 65a to open the valve 62 and supply air under pressure to the cylinders 31 to force the sleeves 27 downwardly into frictional engagement with the surfaces 26 of the brake arm 25, thereby holding the plate 21 rigid during the twisting operation to be described. When released the arm 25 is returned to its original position by a spring 75 (Fig. 5) which is attached to an eye 76 carried by the arm 25 in a position to oppose the movement produced by the pull of the cable 50. Suitable stop means may be provided to limit the movement of the arm 25 and its associated parts.

Figure 6:
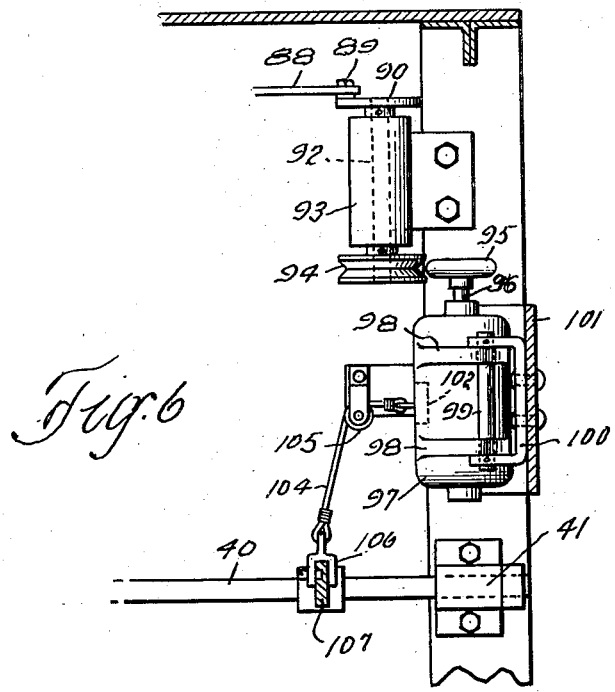
Fig. 6 is a partial vertical section taken on the line 6—6 of Fig. 3.

The gripper comprises a pair of pins 80 (Figs. 2, 4, 7, 8 and 9) which are spaced to receive the loose end 81 of the gasket strip therebetween and are mounted on a head 82 which is journaled by means of a shaft 83 (Fig. 2) in a boss 84 attached to the table 10. The pins 80 project through a slot 85 (Figs. 7, 8 and 9) in the plate 21 which provides clearance for the relative movement of the plate 21 and the pins 80. The shaft 83 carries an arm 86 (Fig. 3) which is normally held in a retracted position by a spring 87. The arm 86 is attached by a link 88 and pin 89 to a crank 90 which is mounted on a shaft 92 (Fig. 6) journaled in a bracket 93 attached to a leg 11. The shaft 92 carries at its lower end a friction pulley 94 which is engageable by a friction pulley 95 mounted on the shaft 96 of a motor 97. The motor 97 is mounted on arms 98 which are hinged by means of a pin 99 to a bracket 100 which is carried by an arm 101 (Figs. 2 and 3) attached to the legs 11. The motor housing carries an arm 102 (Fig. 3) to which a spring 103 is attached for holding the friction pulleys 94 and 95 disengaged. A cable 104 (Figs. 1, 3 and 6) attached to the arm 102, passes over an idler pulley 105 and is attached by a clip 106 to a lever 107 attached to the rod 40. The cable 104 is so arranged that downward movement of the lever 107 swings the friction pulley 95 into engagement with the friction pulley 94 for driving the crank 90 and causing the arm 86 and the pins 80 to oscillate about the shaft 83 as a center. The pins 80 are located with their inner edges at about the axis of the shaft 83, so that oscillation of the pins 80 twists the strip 81 which is held therebetween to break off the strip adjacent said inner edges.

The lever 107 is actuated by an air cylinder 110 (Fig. 2) which is pivoted to the lever 107 by means of a bracket 111 and clip 112. The clip 112 is pivoted to the bracket 111 by means of a pin 113 (Fig. 1) and is provided with a set screw 114 which permits adjustment of the clip 112 along the lever 107. The cylinder 110 carries a piston 120 which is attached to a piston rod 121 pivoted by a pin 122 to a bracket 123 attached to the table 10. The cylinder 110 is provided with an air port below the pistons 120 which is connected by a pipe 125 to a two-way valve 126. The valve 126 receives air through a pipe 127 and a pressure regulating valve 128 from the supply line 64 and vents to the atmosphere through a pipe 129. A foot lever 130 controls the action of the valve 126 to connect the pipe 125 either to the pressure pipe 127 or to the vent 129.

The cylinder 110 is provided with a second port located above the piston 120 which is connected by a pipe 132 (Fig. 1) to a liquid receiver 133 which may for example contain oil. The oil in the receiver 133 is maintained under pressure from a supply line 134 which is connected through a pressure regulating valve 135 and pipe 136 to the top of the receiver 133. The pressure maintained on the oil in the receiver 133 is normally such as to hold the piston 120 in its lower position when the pipe 125 is vented to the atmosphere, but allows the piston to be elevated in the cylinder 110 when pressure from the pipe 127 is supplied through the pipe 125 to the cylinder 110.

Figure 7:
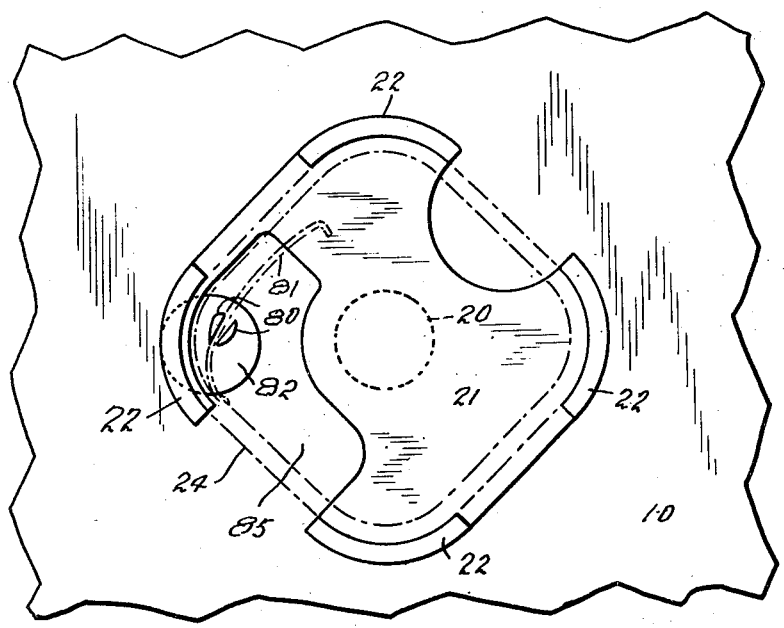
Fig. 7 is a top plan view of the receptacle showing its initial position with respect to the gripper.

In the operation of this device the foot pedal 130 is normally held in its upper position with the valve 126 in a position to vent the pipe 125 to the atmosphere, thereby allowing the piston 120 to be depressed in the cylinder 110. Since the piston 120 is attached to the pivoted rod 121 and is thus prevented from longitudinal movement, the effect is to raise the cylinder 110 and with it the lever 107. The lever 107 also controls the position of the rod 40 and the lever 39, retaining the latter in elevated position. The plate 21 and the pins 80 are in the position shown in Fig. 7 with the pins 80 at rest. A spiral wound gasket 24 is now placed on the plate 21 with the inner extension 81 of its metal strip between the two pins 80. If a plurality of gaskets 24 are to be treated they may be placed on the plate 21 in superposed relationship with all their inner extensions 81 disposed between the pins 80 as shown in Fig. 7.

Figure 8:
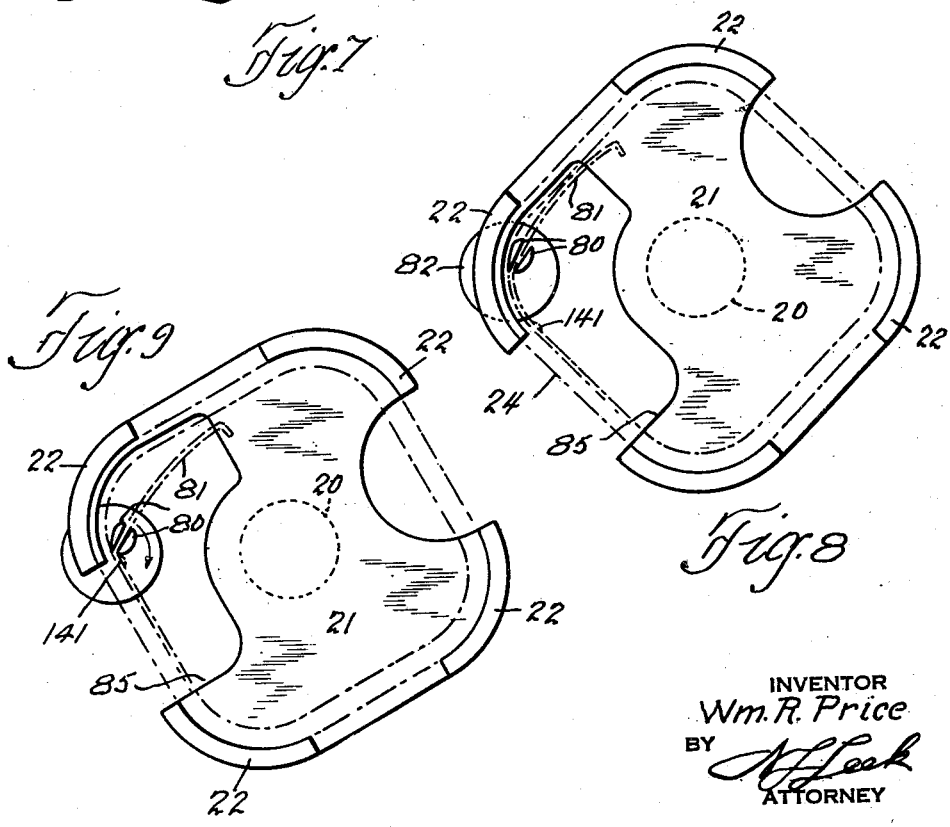
Fig. 8 is a top plan view similar to Fig. 7 showing the position of the receptacle after advancing laterally with respect to the gripper.
Figure 9:
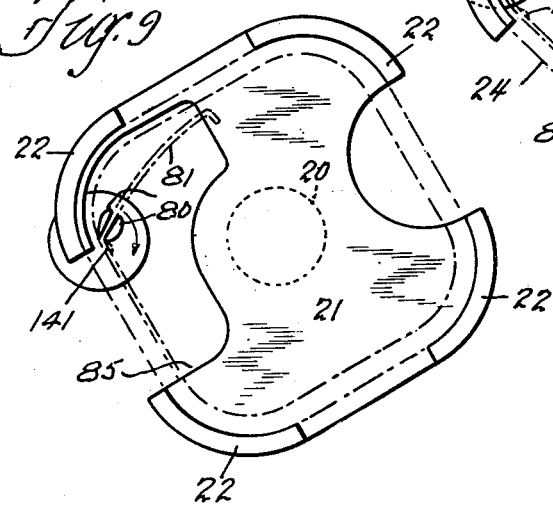
Fig. 9 is a similar top plan view showing the final position of the receptacle after advancing and rotating to bring the gripper into contact with the first weld of the gasket strip.

The foot lever 39 is now depressed to actuate the valve 126 and supply air under pressure from the line 127 to the line 125, thereby lowering the cylinder 110 with respect to the piston 120 and depressing the levers 107 and 39. As the lever 39 starts its downward movement, the cable 35 pulls the bushing 13 laterally and causes the bushing with the plate 21 to slide laterally until the pins 80 are brought against the inner periphery of the gasket as shown in Fig. 8, thereby limiting further lateral movement of the plate 21. Further downward movement of the lever 39 causes the cable 50 to pull on the brake arm 25 and rotate the arm 25, shaft 20 and plate 21 about the shaft 20 as an axis. This rotation of the plate 21 causes the pins 80 to slide along the loose end 81 of the gasket strip until the pins engage the first weld, indicated at 141 in Fig. 9. If more than one gasket is being treated at the same time, it is to be understood that the welds will be similarly located in all of the gaskets. The plate 21 and gaskets are now held in the position shown in Fig. 9 while further downward movement of the lever 39 actuates the valve 62 to supply air to the cylinders 31 and thereby force the sleeves 27 downwardly onto the brake surfaces 26. This action locks the plate 21 securely in the position shown in Fig. 9 and holds the same rigid during the following twisting operation.

Downward movement of the lever 107 causes the cable 104 to swing the motor 97 about the pin 99 and bring its friction pulley 95 into driving engagement with the friction pulley 94. The position of the clip 106 on the lever 107 is so adjusted that the pulleys 94 and 95 are brought into driving engagement after the brake arm 25 has been locked by the sleeves 27 as above described. The motor 97 thus drives the crank 90 and, through the arm 86, causes the shaft 83 and pins 80 to oscillate about the axis of the shaft 83. The pins 80 thus twist the loose end of the strip 81 rapidly back and forth about the weld 141 as a center until the strip 81 is broken off at that point.

After the strip 81 has been broken off as above described, the lever 130 is released, thereby venting the line 125 and permitting the fluid within the cylinder 133 to return to the top of the cylinder 110 and again raise the levers 107 and 39. This releases the driving motor and allows the same to be retracted from driving engagement by the spring 103. It also releases the air pressure on the cylinders 31 to permit the sleeves 27 to be retracted by the springs 29 and the plate 21 to be restored to its original position by the spring 75. The gasket or gaskets may then be removed from the plate 21.

The cables 35, 50 and 104 may, of course, be replaced by other drive mechanisms. For example, separate air or hydraulic cylinders may be provided for the control of the brake arm 25, the bushing 13 and the motor 97, respectively, and may be mounted for direct connection thereto. The timing of the various cylinders would be controlled by suitable valves. Such constructions may be particularly desirable for the brake arm or bushing control where a plurality of gaskets are to be treated simultaneously as in that case considerable force is required to bend the ends 81 beyond their elastic limit as required to permit them to be broken off by the oscillating pins 80.

It will be understood that in normal use the above operations of removing the loose ends 81 from a set of gaskets requires only a few seconds. The machine is accordingly adapted to commercial operation and is designed to break off the loose ends 81 accurately at the location of the first weld leaving the gasket with a smooth inner peripheral surface.

Although a specific embodiment of the machine has been shown for purposes of illustration, it is to be understood that the machine is capable of various uses and that changes and modifications may be made therein as will be apparent to a person skilled in the art. The invention is only to be restricted in accordance with the scope of the following claims.

What is claimed is:

1. A machine for removing from welded, spiral wound strip-metal gaskets the ends of strip metal projecting within said gasket beyond the first weld, comprising a receptacle having walls shaped to receive and hold the peripheral edges of said gasket, a gripper extending within said receptacle and having a slot to receive said projecting strip, means for shifting the relative positions of said gripper and said receptacle to slide said projecting strip through said slot in said gripper until said first weld engages said gripper, and means for oscillating said gripper transversely of said strip to flex and break off said projecting strip at said first weld.

2. A machine for removing from welded, spiral-wound, strip metal gaskets the ends of strip metal projecting within said gasket beyond the first weld, comprising a receptacle having walls shaped to receive and hold the peripheral edges of said gasket and mounted for lateral and rotational movement, a gripper extending within said receptacle and having a slot to receive said projecting strip, means for shifting said receptacle both laterally and rotatably to slide said projecting strip through said slot in said gripper until the first weld engages said gripper, and means for oscillating said gripper transversely of said strip to flex and break off said projecting strip at said first weld.

3. A machine for removing from welded, spiral-wound, strip-metal gaskets the ends of strip metal projecting within said gasket beyond the first weld, comprising a receptacle having walls shaped to receive and hold the peripheral edges of said gasket, a gripper extending within said receptacle and having a slot to receive said projecting strip, means for shifting said receptacle to slide said projecting strip through said slot in said gripper until the first weld engages said gripper, means clamping the receptacle in said position, and means oscillating said gripper transversely of said strip to flex and break off said projecting strip at said first weld.

4. A machine for removing from welded, spiral-wound, strip-metal gaskets the ends of strip metal projecting within said gasket beyond the first weld, comprising a receptacle having walls shaped to receive and hold the peripheral edges of said gasket, a gripper extending within said receptacle and having a slot to receive said projecting strip, a slidable carriage, means pivotally mounting said receptacle on said carriage, means sliding said carriage and pivoting said receptacle to slide said projecting strip through said slot in said gripper until the first weld engages said gripper, and means for oscillating said gripper transversely of said strip to flex and break off said projecting strip at said first weld.

5. In a machine as set forth in claim 4, a fixed brake member mounted on said carriage and brake means to engage said member for clamping said carriage in position.

6. A machine as set forth in claim 5 in which said brake means comprises air actuated pistons and means supplying air under pressure to actuate said pistons.

7. A machine as set forth in claim 4 including timed actuating means connected to said carriage and said receptacle and having means to first shift said carriage and then pivot said receptacle thereon.

8. A machine as set forth in claim 4 in which said gripper comprises a pair of pins between which said strip is disposed, a shaft carrying said pins, and means oscillating said shaft about its axis.

9. A machine as set forth in claim 8 in which said pins project axially from said shaft and are disposed with one edge at the axis of said shaft.

10. A machine as set forth in claim 9 including a crank connected to oscillate said shaft and a driving motor connected to drive said crank.

11. In a machine as set forth in claim 10, timed means to oscillate said shaft and means rendering said last means operative only after the gripper has been positioned against said first weld.

WILLIAM R. PRICE.

REFERENCES CITED

The following references are of record in the file of this patent:

UNITED STATES PATENTS

| Number | Name | Date |
|---|---|---|
| 345,104 | Brainard | July 6, 1886 |
| 673,526 | Moore | May 7, 1901 |